US007362011B2

(12) United States Patent
Komatsu et al.

(10) Patent No.: US 7,362,011 B2
(45) Date of Patent: Apr. 22, 2008

(54) APPARATUS FOR PREVENTING CORROSION OF CONTACT

(75) Inventors: Kazuhiro Komatsu, Hyogo (JP); Masahiko Fujimoto, Hyogo (JP); Kouji Oonishi, Hyogo (JP); Keisuke Kido, Hyogo (JP); Junichi Sawada, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 498 days.

(21) Appl. No.: 11/067,985

(22) Filed: Mar. 1, 2005

(65) Prior Publication Data

US 2005/0231876 A1 Oct. 20, 2005

(30) Foreign Application Priority Data

Apr. 5, 2004 (JP) .......................... P2004-111030

(51) Int. Cl.
*H01G 2/12* (2006.01)
*H01H 1/60* (2006.01)

(52) U.S. Cl. ...................... 307/137; 361/93.8; 205/725

(58) Field of Classification Search ................ 307/137, 307/132 T, 117; 205/725, 727, 775.5; 200/281; 204/196.02; 324/700, 421; 361/93.8, 103
See application file for complete search history.

(56) References Cited

U.S. PATENT DOCUMENTS 3,794,850 A * 2/1974 Hirose ........................ 307/137
4,398,145 A * 8/1983 Quayle ........................ 324/700
4,540,874 A 9/1985 Shaffer, Jr. et al.
5,243,297 A * 9/1993 Perkins et al. .............. 324/700
5,258,654 A * 11/1993 Roberts et al. ............. 307/137
5,523,633 A 6/1996 Imaizumi et al.
6,160,402 A * 12/2000 Naglich et al. ............. 324/421
7,109,721 B2 * 9/2006 Maurer et al. .............. 307/137

FOREIGN PATENT DOCUMENTS

EP 0 501 681 A1 9/1992
EP 0 528 379 A2 2/1993
JP 63-237319 10/1988

(Continued)

OTHER PUBLICATIONS

U.S. Appl. No. 11/068,393, filed Mar. 1, 2005, Komatsu et al.
U.S. Appl. No. 11/067,986, filed Mar. 1, 2005, Komatsu et al.

*Primary Examiner*—Michael Sherry
*Assistant Examiner*—Andrew Deschere
(74) *Attorney, Agent, or Firm*—Oliff & Berridge, PLC

(57) ABSTRACT

An apparatus for preventing a contact from being corroded includes a power source, a signal line connected to the contact, a resistance connected to the signal line, a switching section, a comparator, and an overheat detecting section. The switching section has a switch between the power source and the signal line. An impedance of the switch is smaller than that of the resistance when the switch is turned on. The comparator compares a potential of the signal line with a predetermined potential to determine as to whether or not the contact is corroded. The comparator outputs a driving signal when the comparator concludes that the contact is corroded. The overheat detecting section detects whether or not temperature of the apparatus exceeds a predetermined temperature. The overheat detecting section decreases current flowing through the switching section when the temperature of the apparatus exceeds the predetermined temperature.

21 Claims, 10 Drawing Sheets

FOREIGN PATENT DOCUMENTS

| | | |
|---|---|---|
| JP | 01-281621 | 11/1989 |
| JP | 02-278620 | 11/1990 |
| JP | 02-297818 | 12/1990 |
| JP | 03-205710 | 9/1991 |
| JP | 04-033220 | 2/1992 |
| JP | 06-096637 | 4/1994 |
| JP | 07-006650 | 1/1995 |
| JP | 07-014463 | 1/1995 |
| JP | 07-015301 | 1/1995 |
| JP | 2001-084860 | 3/2001 |
| JP | 2002-343171 | 11/2002 |

* cited by examiner

FIG. 12

| SETTINGS OF INPUT CIRCUIT | FUNCTION OF PREVENTING CORROSION OF CONTACT | SEL 1 | SEL 2 | SEL 3 |
|---|---|---|---|---|
| L SIDE SW | ○ | H | L | H |
| L SIDE SW | × | H | L | L |
| H SIDE SW | ○ | L | H | H |
| H SIDE SW | × | L | H | L |
| WITHOUT PULL-UP / PULL-DOWN CONNECTION | × | L | L | L |

APPARATUS FOR PREVENTING CORROSION OF CONTACT

BACKGROUND OF THE INVENTION

1. Field of the Invention

The present invention relates to an apparatus for preventing corrosion of a contact, which flows a large current to thereby destroy an oxide layer developed on the contact such as a switch or a connector and preventing the corrosion.

2. Description of the Related Art

Inputs for various electronic controls have often been connected to a contact such as a switch or a connector. For example, in order to perform various types of control for an automobile, it is necessary to give input signals for control to many electronic control units (ECU). Input signals are given to an input terminal of an electronic control unit from a contact of a switch, which mechanically opens and closes, via a contact of a connector.

Contacts such as a switch and a connector have been made with metal materials excellent in electric conduction so as to reduce contact resistance in electric connection. These contacts may increase in contact resistance because a surface of a contact part is oxidized during electric disconnection. Further, a surface of a part exposed around the contact part may be oxidized to produce an oxide and then, the oxide may be caught in the contact part, resulting in an increased contact resistance. Even if the contact is oxidized to increase the contact resistance, when a contact state and a non-contact state are appropriately repeated and a relatively large current flows in the contact state, heat generated by the current removes the oxide, so that the increase of the contact resistance can be prevented.

However, with regard to input into an electronic appliance, it is in general not necessary to flow a large current capable of preventing corrosion constantly into contacts. An intermittent flow of such a large current may contribute to malfunctions due to noise. In addition, flowing a large current into a contact may deteriorate electric life of the contact largely or may cause adhesion of the contact. In order to solve these problems, JP-A-Hei. 2-297818 discloses an apparatus for controlling a current flowing into contacts. The apparatus detects a contact resistance of the contact, and flows a large current into between the contacts when the detected contact resistance is equal to or larger than a predetermined reference value.

Also, U.S. Pat. No. 5,523,633 discloses a circuit for preventing corrosion of a switch for large current. The switch allows a large current in a pulse shape during a period in which a contact of the switch is turned on, when the switch for large current is employed in a low-current system such as electronic control units. In addition, JP-A-Hei. 7-14463 discloses a device for discriminating contact signals. The device allows a corrosion-prevention current in a pulse shape to flow periodically by means of charge and discharge into a condenser. JP-A-2002-343171 also discloses a device for preventing corrosion of a contact of a switch. The device flows large current for preventing corrosion for at least a predetermined holding time from a time point where the contact of the switch is changed from an opened state to a closed state. When the contact of the switch is in the opened state, the device decreases an impedance of an input signal line connected to the contact.

SUMMARY OF THE INVENTION

In the techniques disclosed in JP-A-Hei. 2-297818, U.S. Pat. No. 5,523,633, JP-A-Hei. 7-14463, and JP-2002-343171, a pulse-like corrosion-prevention current is flown with a contact being in a closed state, without detecting the contact resistance of the contact of a switch. Thus, if the switch is opened and closed frequently, a pulse-like corrosion-prevention current may also be flown frequently even when the contact resistance of the contact does not increase, to thereby increase power consumption or generate noise. In addition, since a corrosion-prevention current is a relatively large current, the current will generate heat when the current is frequently supplied from large-scale semiconductor integrated circuit (LSI).

As disclosed in JP-A-Hei. 2-297818, if the contact resistance of a contact is detected and a corrosion-prevention current is flown during a period in which the contact resistance is high, it is possible not to flow a corrosion-prevention current when corrosion prevention is not required. Further, in JP-A-Hei. 2-297818, a circuit for detecting an increase of the contact resistance of a contact of a switch can detect the contact resistance when the switch is turned off, to thereby attaining a low impedance. However, if the contact resistance is not lowered even with detecting increasing of the contact resistance and flowing the corrosion-prevention currently is flown continuously, the corrosion-prevention current is kept being flown. If the current control apparatus for the contact is integrated into an LSI, since the corrosion-prevention current is kept being supplied, loss in the LSI increases, resulting in thermal destruction of the LSI. For example, in a case where a contact area of the contact is decreased due to wearing of the contact, the contact resistance would not be decreased even if the corrosion-prevention current is flown.

Further, when a poor contacting state due to corrosion of a contact is detected by referring to the potential variation corresponding to increasing of the contact resistance, the potential variation due to an abnormal cause different from increasing of the contact resistance resulting from corrosion is detected as corrosion and a corrosion-prevention current is flown. If such potential variation is not caused by corrosion, the potential will not recover after the corrosion-prevention current is flown, thereby keeping a state where it is detected that the corrosion occurs. Therefore, the corrosion-prevention current is kept being flown, thereby resulting in increasing loss or causing thermal destruction. Causes of anomalies include a case where contacts or input signal lines is short-circuited with a line of intermediate potential between power-source potential and ground potential; and a case where the ground potential to which contacts are connected is away from an actual ground potential.

The invention provides an apparatus for preventing corrosion of a contact, which can flow a corrosion-prevention current only when contact corrosion is detected. The apparatus also can perform a protect operation in an abnormal operation where the corrosion-prevention current is kept being flown.

According to one embodiment of the invention, an apparatus for preventing a contact from being corroded, includes a power source, a signal line, a first resistance, a switching section, a comparator, and an overheat detecting section. The signal line is connected to the contact. The first resistance is connected to the signal line. The switching section includes a first switch between the power source and the signal line. An impedance of the first switch is smaller than that of the first resistance when the first switch is turned on. The comparator includes potential of the signal line with a predetermined potential to determine as to whether or not the contact is corroded. The comparator outputs a driving signal when the comparator concludes that the contact is corroded. The overheat detecting section detects as to whether or not temperature of the apparatus exceeds a predetermined temperature. The overheat detecting section decreases current flowing through the switching section when the temperature of the apparatus exceeds the predetermined temperature. The first resistance and the switching section are connected in parallel between the power source and the signal line. Upon receiving the driving signal from the comparator, the first switch is turned on.

With this configuration, when the comparator concludes that the contact is corroded, the corrosion-prevention current flows. Also, in an abnormal operation where the corrosion-prevention current keeps flowing continuously, a protecting operation, which decreases heat generation due to the corrosion-prevention current, can be performed.

According to one embodiment of the invention, an apparatus for preventing a contact from being corroded includes a power source, a signal line, a resistance, a switch, a comparator, an anomaly determining section, and a protecting section. The signal line is connected to the contact. The resistance is connected to the signal line. The switch is disposed between the power source and the signal line. An impedance of the switch is smaller than that of the resistance. The comparator compares a potential of the signal line with a predetermined potential to determine as to whether or not the contact is corroded. The comparator outputs a driving signal when the comparator concludes that the contact is corroded. The anomaly determining section compares the potential of the signal line with a threshold level and determine as to whether or not the potential of the signal line is abnormal on a basis of a comparison result of the anomaly detecting section. The protecting section performs a predetermined protecting operation when the anomaly determining section keeps determining that the potential of the signal line is abnormal, for a predetermined time period. When a contact resistance of the contact increases, the potential of the signal line changes toward one side in a magnitude relation. The predetermined potential is set to be on the other side with respect to the threshold level in the magnitude relation. The resistance and the switch are connected in parallel between the power source and the signal line. Upon receiving the driving signal from the comparator, the switch is turned on.

With this configuration, when the comparator concludes that the contact is corroded, the corrosion-prevention current flows. Also, except for the potential of the signal line when the contact is in the non-contact state, it is expected that the potential of the signal line does not change from the other side of the predetermined potential to the one side thereof in the magnitude relation. Therefore, in an abnormal operation where the corrosion-prevention current keeps flowing continuously, a predetermined protecting operation can be performed.

An apparatus for preventing a plurality of contacts from being corroded includes a plurality of preventing devices, a power source, and an anomaly determining section. The preventing devices are provided for the contacts, respectively. Each of the preventing devices includes a signal line, a resistance, a switch, and a comparator. The signal line is connected to the contact. The resistance is connected to the signal line. The switch is disposed between the power source and the signal line. An impedance of the switch is smaller than that of the resistance when the switch is turned on. The comparator compares a potential of the signal line with a predetermined potential to determine as to whether or not the contact is corroded. The comparator outputs a driving signal when the comparator concludes that the contact is corroded. When current flows through the switches in at least two of the signal lines of the preventing apparatuses simultaneously, the anomaly determining section concludes that the signal lines are abnormal.

With this configuration, when the comparator concludes that the contact is corroded, the corrosion-prevention current flows originally, since frequency of flowing of the corrosion-prevention current is low, it is expected that the corrosion-prevention current does not flow simultaneously into two or more contacts among the plural contacts. However, when the contact is in an abnormal state, the corrosion-prevention operations are performed with respect to two or more contacts independently. Therefore, the corrosion-prevention operations may overlap each other in terms of time. The anomaly determining section monitors corrosion-prevention current flowing through each signal line. When current flows through the switches in at least two of the signal lines of the preventing apparatuses simultaneously, the anomaly determining section concludes that the signal lines are abnormal. As a result, the anomaly judgment on the contact can be made easily.

BRIEF DESCRIPTION OF THE DRAWINGS

FIG. 12 is a table showing the functions of the apparatus 102Cx shown in FIG. 11.

DETAILED DESCRIPTION OF THE PREFERRED EMBODIMENT

Respective embodiments of the invention will be described with reference to the accompanied drawings. In each of the embodiments, the same reference numbers are given to parts equivalent to those for which a prior description is made, thereby omitting overlapping description. However, parts to which the same reference numbers are given are not necessarily structured in an exactly the same way. As a matter of course, various modifications may be made.

Figure 1:
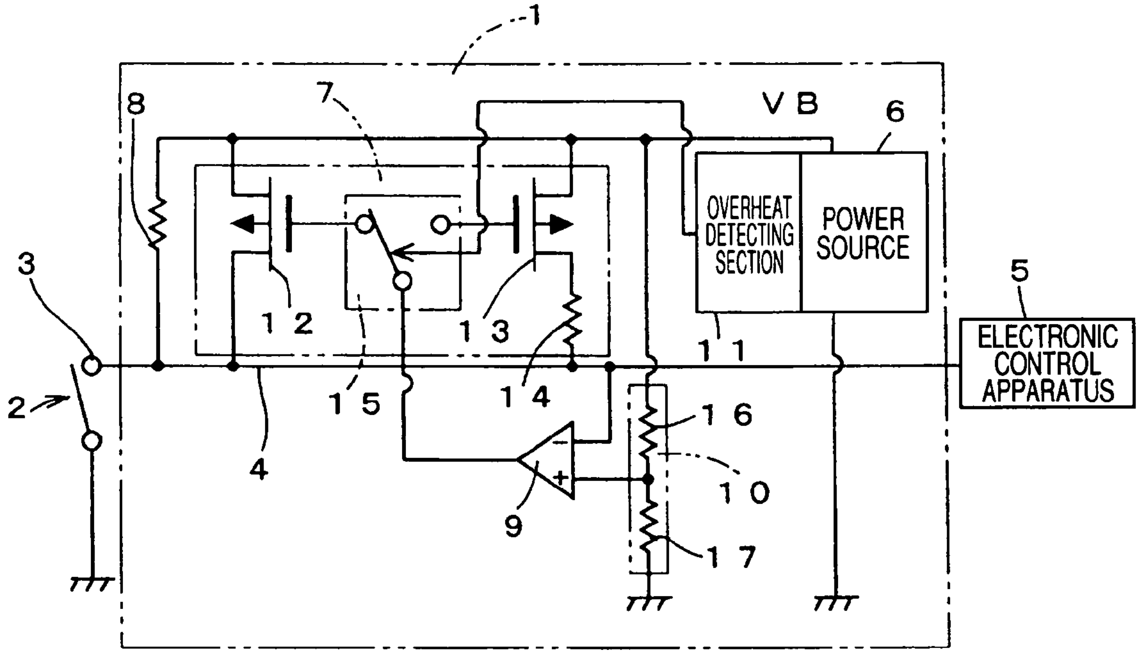
FIG. 1 is a block diagram illustrating a schematic electrical configuration of an apparatus 1 for preventing corrosion of a contact, according to a first embodiment of the invention.

FIG. 1 illustrates a schematic electrical configuration of a apparatus 1 for preventing corrosion of a contact, according to a first embodiment of the invention. The apparatus 1 has a function of preventing corrosion of a contact 3 of a switch 2. The contact 3 is connected via an input signal line 4 to an input side of the electronic control apparatus 5 at a subsequent stage. The contact 3 may be a contact of a connector. The apparatus 1 may be realized as a part of an LSI. A power source 6 generates a power-supply voltage for operating a logic circuit, from power supplied outside the LSI, and supplies it to inside of the LSI. The power-supply voltage for operating the logic circuit is, for example, 5V or 3.3V. This power source 6 is grounded at a low side thereof and outputs the power-source voltage from a high side thereof. The contact 3 is different in number and structure, depending on types and structures of the switch 2 or a connector. Moreover, the contact resistance of the contact 3 is an electric resistance of surface parts, which will contact each other to make electrical connection.

The switch 2 is connected to the low side of the power source 6. When the switch 2 is turned on, the contact 3 is connected to a ground potential. A low impedance section 7 and a resistance 8 are connected between the high side of the power source 6 and the input signal line 4. A comparator 9 compares a potential of the input signal line 4 with a predetermined potential, which is given by a reference potential source 10. The predetermined potential is set so that when the potential of the input signal line 4 exceeds the predetermined potential, the contact 3 is corroded. When the comparator 9 judges that the potential of the input signal line 4 exceeds the predetermined potential, the low impedance section 7 is activated. An inverting input terminal of the comparator 9 is connected to the input signal line 4, and a non-inverting input terminal is connected to the predetermined potential given by the reference potential source 10. When the potential of the input signal line 4 is on one side with respect to the predetermined potential in a magnitude relation, the comparator 9 outputs a logical output of a low level. On the contrary, when the potential of the input signal line 4 is on the other side with respect to the predetermined potential in the magnitude relation, the comparator 9 outputs a logical output of a high level. Specifically, when the potential of the input signal line 4 is lower than the predetermined potential toward the ground potential side (the other side with respect to the predetermined potential), the comparator 9 outputs the logical output of the high level. At this time, switching elements 12, 13, which are P-channel MOS transistors, are in the off state, that is, are not turned on. On the other hand, when the potential of the input signal line 4 is higher than the predetermined potential toward the high side of the power source 6 (that is, the potential of the input signal line 4 is on the other side with respect to the predetermined potential), the comparator 9 outputs the logical output of the low level. At this time, the switching element 12, 13, which are P-channel MOS transistors, are in the on state, that is, are turned on. If the switch 2 is in the off state, the potential of the input signal line 4 is higher than the predetermined potential, so that either one of the switching elements 12, 13 of the low impedance section 7 is in the on state. Since the low impedance section 7 is in the on state, the impedance of the input signal line 4 is lower than that when the low impedance section 7 is in the off state. However, since the switch 2 is turned off, current does not flow into the contact 3. As a result, power consumption does not increase.

The low impedance section 7 connects the input signal line 4 with the high side of the power source 6 at an impedance lower than that of the resistance 8 when either one of the switching elements 12 or 13 is turned on. In this instance, when the switch 2 is in the on state, a corrosion-prevention current flows into the contact 3 to thereby remove an oxide. When the low impedance section 7 is not operated, an impedance of the low impedance section 7 is higher than the resistance value (impedance) of the resistance 8, thereby an impedance between the input signal line 4 and the high side of the power source 6 becomes higher. Thus, even when the switch 2 is turned on, a current flows into the contact 3 only in a small amount, thereby resulting in a decrease in power consumption, although no oxide is removed.

The power source 6 has an overheat detecting section 11 inside or in the vicinity thereof. The overheat detecting section 11 detects overheat in a case where a corrosion-prevention current flows continuously or at a high frequency, thereby elevating the temperature. When the apparatus 1 is formed as an intergraded circuit on a semiconductor chip, the overheat detecting section 11 may detect an overheat state of the semiconductor chip.

The low impedance section 7 includes the switching elements 12 and 13 such as a P channel MOS transistor, a resistance 14 and a switch 15. The switching elements 12 and 13 are disposed so that drain-source of the MOS transistors are connected between the input signal line 4 and the high side of the power source 6. When the comparator 9 outputs the logical output of the low level, the switching elements 12, 13 are turned on. On the other hand, when the comparator 9 outputs the logical output of the high level, the switching elements 12, 13 are turned off. The switch 15 is disposed between the output terminal of the comparator 9 and the gate of the MOS transistors, which is control input terminals of the switching elements 12, 13. The switch 15 is switched in response to an output from the overheat detecting section 11. When the overheat detecting section 11 does not detect the overheat state, the logical output of the comparator 9 is given to the control input terminal of the switching element 12. At this time, if the potential of the input signal line 4 is higher than the predetermined voltage given by the reference potential source 10, the switching element 12 is turned on, so that the impedance of the input signal line 4 becomes low. When the overheat detecting section 11 detects the overheat state, the switch 15 is switched so that the logical output of the comparator 9 is given to the control input terminal of the switching element 13. The switching element 13 is serially connected to the resistance 14. When the switching element 13 is turned on, the impedance of the switching element 13 and the resistance 14 is higher than that of the switching element 12. Thereby, the corrosion-prevention current flowing into the contact can be reduced. However, it should be noted that even if the corrosion-prevention current is reduced, an amount of the corrosion-prevention current remains in a range where it can sufficiently remove an oxide.

That is, the apparatus 1 for preventing the corrosion of the contact 3 includes the power source 6, the signal line 4 connected to the contact 3, the resistance 8 serving as a first resistance, a switching section, and the comparator 9. The resistance 8 is connected to the signal line 4. The switching section includes the switching element serving as a first switch between the power source 6 and the signal line 4. An impedance of the switching element 12 is smaller than that of the resistance 8 when the switching element 12 is turned on. The comparator 9 compares the potential of the signal line 4 with a predetermined potential to determine as to whether or not the contact 3 is corroded. The comparator 9 outputs a driving signal when the comparator 9 concludes that the contact 3 is corroded. The resistance 8 and the switching section are connected in parallel between the power source 6 and the signal line 4. Upon receiving the driving signal from the comparator 9, the switching element 12 is turned on. Accordingly, when it is detected that the contact 3 is corroded, the corrosion-prevention current is flown. It should be noted that the reference potential source 10 may be realized with such a simple configuration that, e.g., the high side of the power source 6 and the ground potential on the low side are divided by the resistances 16 and 17.

The apparatus 1 further includes the overheat detecting section 11 that detects whether or not temperature of the apparatus exceeds a predetermined temperature and decreases current flowing through the switching section when temperature of the apparatus exceeds the predetermined temperature. In this embodiment, when the overheat state is detected, the low impedance section 7 decreases the corrosion-prevention current during a period in which the low impedance section 7 is activated to cause the input signal line 4 to have a low impedance, in response to the detection result by the overheat detecting section 11. This is because when the overheat detecting section 11 detects the overheat state, the switch 15 is switched to the switching element 13 side and the resistance 14 limits the corrosion-prevention current. The switch 15 is implemented by a logical circuit and performs the switching electronically. The limiting of the corrosion-prevention current by the low impedance section 7 may be realized by selecting one having a conductive resistance higher than that of the switching element 12, as the switching element 13. When the overheat detecting section 11 detects the overheat state, the corrosion-prevention current is reduced during a period in which the input signal line 4 is controlled to have a low impedance. Therefore, in an abnormal operation state where the corrosion-prevention current keeps flowing, the apparatus 1 can perform a protecting operation for reducing heat generation by the corrosion-prevention current.

Figure 2:
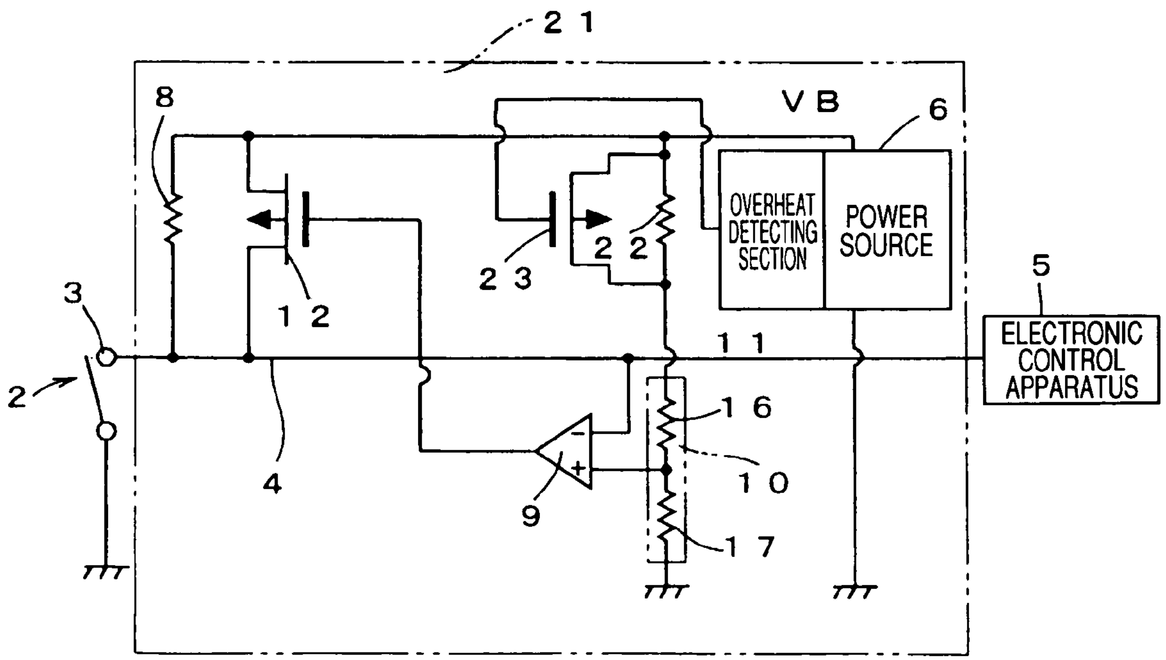
FIG. 2 is a block diagram illustrating a schematic electrical configuration of an apparatus 21 for preventing corrosion of a contact, according to a second embodiment of the invention.

FIG. 2 illustrates a schematic electrical configuration of an apparatus 21 for preventing corrosion of a contact, in accordance with a second embodiment of the invention. In the apparatus 21, a resistance 22 and a switching element 23 are inserted between the reference potential source 10 and the high side of the power source 6. The resistance 22 is connected in series to the resistance 16 on the high side of the reference potential source 10. The switching element 23 is implemented by a P channel MOS transistor, for example. The source and drain thereof are connected respectively to both ends of the resistance 22. That is, the switching element 23 is connected in parallel to the resistance 22. The gate of the P channel MOS transistor, which is the switching element 23, is activated by a detection output of the overheat detecting section 11. The switching element 23 is turned off, when the overheat state is not detected. When the switching element 23 is turned off, the predetermined potential of the reference potential source 10 becomes a potential obtained by dividing the power-source potential of the power source 6 by a combined resistance value of the resistances 22 and 16 and a resistance value of the resistance 17. When the overheat state is detected, the switching element 23 is turned on, and the predetermined potential becomes a potential obtained by dividing the power-source potential of the power source 6 by the resistance value of the resistance 16 and that of the resistance 17. Therefore, when the overheat state is detected, the predetermined potential is elevated to a high level side of the power source 6. An intermediate potential between the predetermined potential before elevation and that after elevation is judged to be corrosion before the elevation but not judged to be corrosion after the elevation. Thus, the elevation of the predetermined potential means that the potential of the signal line 4 is changed to the other side of the predetermined potential in the magnitude relation. Here, only the switching element 12 is used as a low impedance section. However, as described before, it is also possible to use the low impedance section 7 similar to that used in the first embodiment of the invention, in combination with another embodiment.

The apparatus 21 for preventing the corrosion of the contact includes the overheat detecting section 11 that detects whether or not temperature of the apparatus exceeds the predetermined temperature. When the over heat detecting section 11 concludes that the temperature of the apparatus 21 exceeds the predetermined temperature, the overheat detecting section 11 changes the predetermined potential so that the comparator 9 concludes that the contact 3 is not corroded. Thereby, in a case where the predetermined potential before the elevation causes the corrosion-prevention current to flow at high frequency, the predetermined potential is changed so that the potential of the input signal line 4 is on the other side of the predetermined potential in the magnitude relation. As a result, frequency of flowing of the corrosion-prevention signal is decreases to reduce heat generation. Even in a case where the potential of the input signal line 4 is abnormal due to short-circuit of the contact 3 or the input signal line 4 with another intermediate potential, the predetermined potential can be changed in the same manner so that it is hard to activate the corrosion-prevention function. As a result, the apparatus 21 can perform a protecting operation for reducing heat generation by the corrosion-prevention current.

Figure 3:
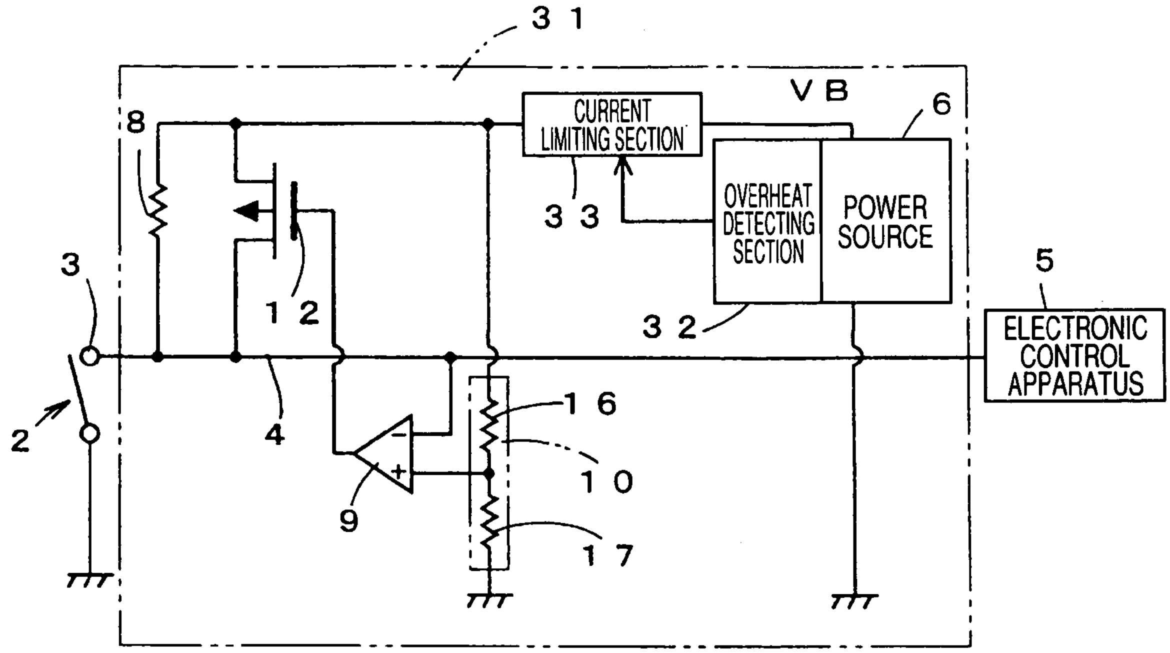
FIG. 3 is a block diagram illustrating a schematic electrical configuration of an apparatus 31 for preventing corrosion of a contact, according to a third embodiment of the invention.

FIG. 3 illustrates a schematic electrical configuration of an apparatus 31 for preventing corrosion of a contact, in accordance with a third embodiment of the invention. The contact apparatus 31 has an overheat detecting section 32 for detecting an overheat state of the power source 6, similar to the overheat detecting section 11 as shown in FIGS. 1 and 2. The apparatus 31 also has a current limiting section 33. The overheat detecting section 32 controls the current limiting section 33 disposed in a channel through which a current is supplied from the power source 6 to the switching element 12 serving as a low impedance section. The current limiting section 33 is implemented by a MOS transistor or a bipolar transistor. When the overheat state is not detected, the current limiting section 33 becomes a low impedance to reduce a limiting amount with respect to the current supply. On the other hand, when the overheat state is detected, the current limiting section 33 becomes a high impedance to limit the current supply.

That is, in the apparatus 31 for preventing the corrosion of the contact 3, a current supplying section, which supplies the corrosion-prevention current to the input signal line 4 and has temperature characteristic for limiting the corrosion-prevention current when the temperature of the apparatus 31 rises, is implemented by the current limiting section 33. The power source 6 may has a function of limiting current when the temperature of the apparatus 31 rises. This current supplying section supplies the corrosion-prevention to the input signal line 4 and has temperature characteristic for limiting the corrosion-prevention current when the temperature of the apparatus 31 rises. Therefore, in an abnormal operation state where the corrosion-prevention current keeps flowing, the current supplying section reduces the corrosion-prevention current due to its temperature characteristic and heat generation by the corrosion-prevention current. As a result, the apparatus 31 can perform a protecting operation.

To be more specific, in the contact corrosion control apparatus 31, an electric-current supplying means for supplying a corrosion-prevention current to the input signal line 4 and realizing temperature characteristics of restricting the corrosion-prevention current is obtained by providing the current limiting section 33. The current supplying means may include the function to restrict the supply of a current when the temperature is elevated as the power source 6. Since such current supplying means is to supply a corrosion-prevention current to the input signal line 4 and provided with temperature characteristics of restricting the corrosion-prevention current when the temperature is elevated, it is able to give a protective operation by utilizing the heat generated by the current, reducing the supply of the current due to its own temperature characteristics, thereby providing a protective operation, at an abnormal time when the current is flown continuously.

Figure 4:
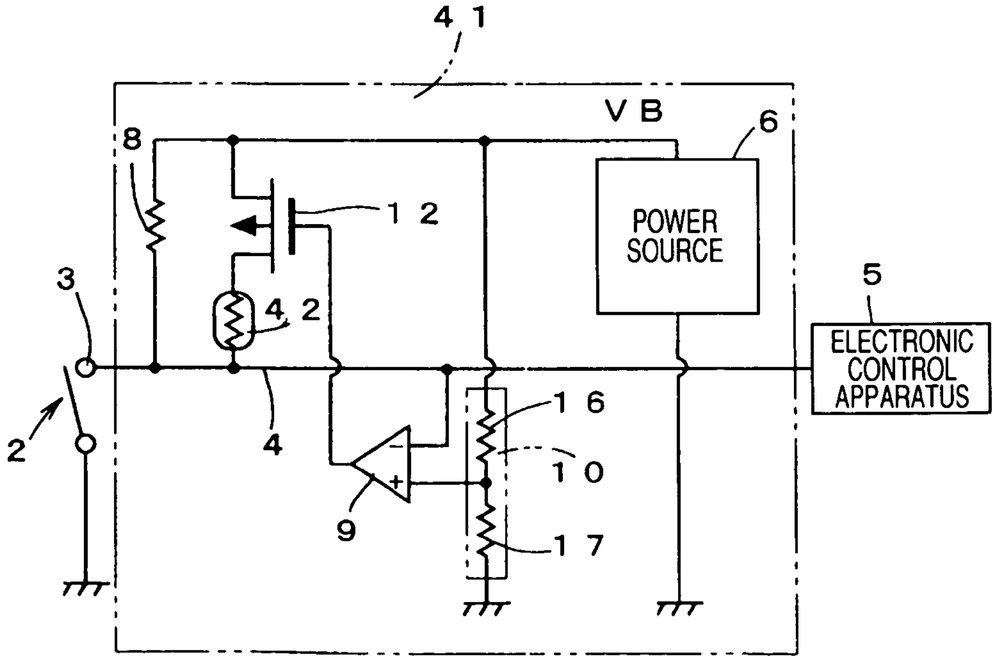
FIG. 4 is a block diagram illustrating a schematic electrical configuration of an apparatus 41 for preventing corrosion of a contact, according to a fourth embodiment of the invention.

FIG. 4 illustrates a schematic electrical configuration of an apparatus 41 for preventing corrosion of a contact, in accordance with a fourth embodiment of the invention. In the apparatus 41, a positive temperature characteristics resistance element 42 is connected in series to the switching element 12 serving as a low impedance section. Although the positive temperature characteristics resistance element 42 is disposed on the drain side of the P channel MOS transistor, which is the switching element 12, the positive temperature characteristic resistance element 42 may be disposed on the source side thereof or disposed at a position of the current limiting section 33 shown in FIG. 3.

The positive temperature characteristics resistance element 42 has positive temperature characteristics, which increase in resistance value according to elevation of temperature. In general, electric conductive materials such as a metal increase in resistance value according to elevation of temperature. For example, if thermal capacity is made small by reducing a sectional area and a corrosion-prevention current is flown continuously, electric power calculated as a product of the square of current value and a resistance value changes in to heat. Thus, the resistance value becomes great by elevation of temperature caused by heat generation and the resistance value. The increase of the resistance value causes further elevation of temperature, resulting in further increase of the resistance value. When the positive temperature characteristics resistance element 42 becomes larger in resistance value, a corrosion-prevention current is limited. Specifically, the positive temperature characteristics resistance element 42 is a resistance element, which is inserted in series into a supply channel through which a corrosion-prevention current is flown into the input signal line 4. The positive temperature characteristic resistance element 42 has such a temperature characteristics that the resistance value thereof increases according to elevation of temperature. Such a positive temperature characteristics resistance element 42 may be implemented by a positive temperature characteristics thermistor. In comparison with using a resistance made of a metal, the thermistor can be made to have a larger temperature coefficient to improve the effect of the current limiting. If it is difficult to form the positive temperature characteristics resistance element 42 inside an LSI, the element 42 may be inserted between a terminal for connecting the input signal line 4 to an outside of an LSI and the contact 3.

Figure 5:
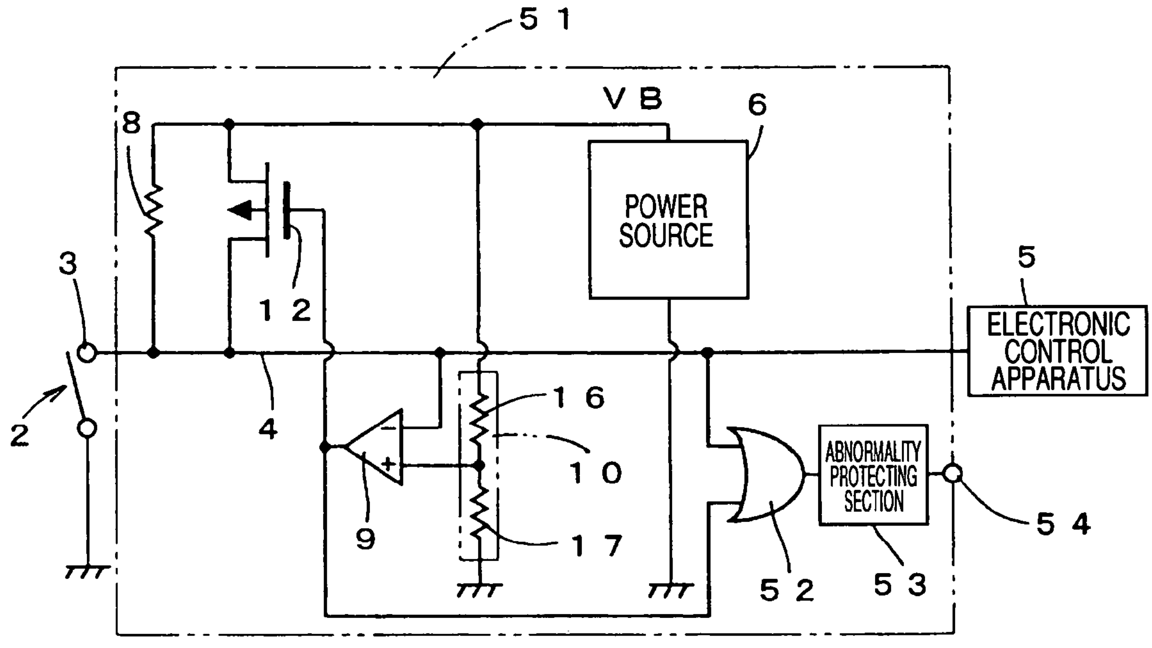
FIG. 5 is a block diagram illustrating a schematic electrical configuration of an apparatus 51 for preventing corrosion of a contact, according to a fifth embodiment of the invention.

FIG. 5 illustrates a schematic electrical configuration of an apparatus 51 for preventing corrosion of a contact, in accordance with a fifth embodiment of the invention. The contact apparatus 51 has an OR circuit 52 to output a logical sum of a logical output of the comparator 9 and the potential of the input signal line 4. The output of the comparator 9 takes a high level (Hi) when the potential of the input signal line 4 is lower than the predetermined potential of the reference potential source 10, and takes a low level (Lo) when the potential of the input signal line 4 is higher than the predetermined potential. If the predetermined potential is lower than a threshold level used in logical judgment by the OR circuit 52, it is possible that the potential of the input signal line 4 is lower than the threshold level even when the potential of the input signal line 4 exceeds the predetermined potential. In this state, the output of the OR circuit 52 takes a low level. When the OR circuit 52 keeps outputting the low level for a predetermined time period, an abnormality protecting section 53 performs a protecting operation, e.g., outputs an abnormal signal to an external terminal 54.

Figures 6A, 6B, 6C, 6D:
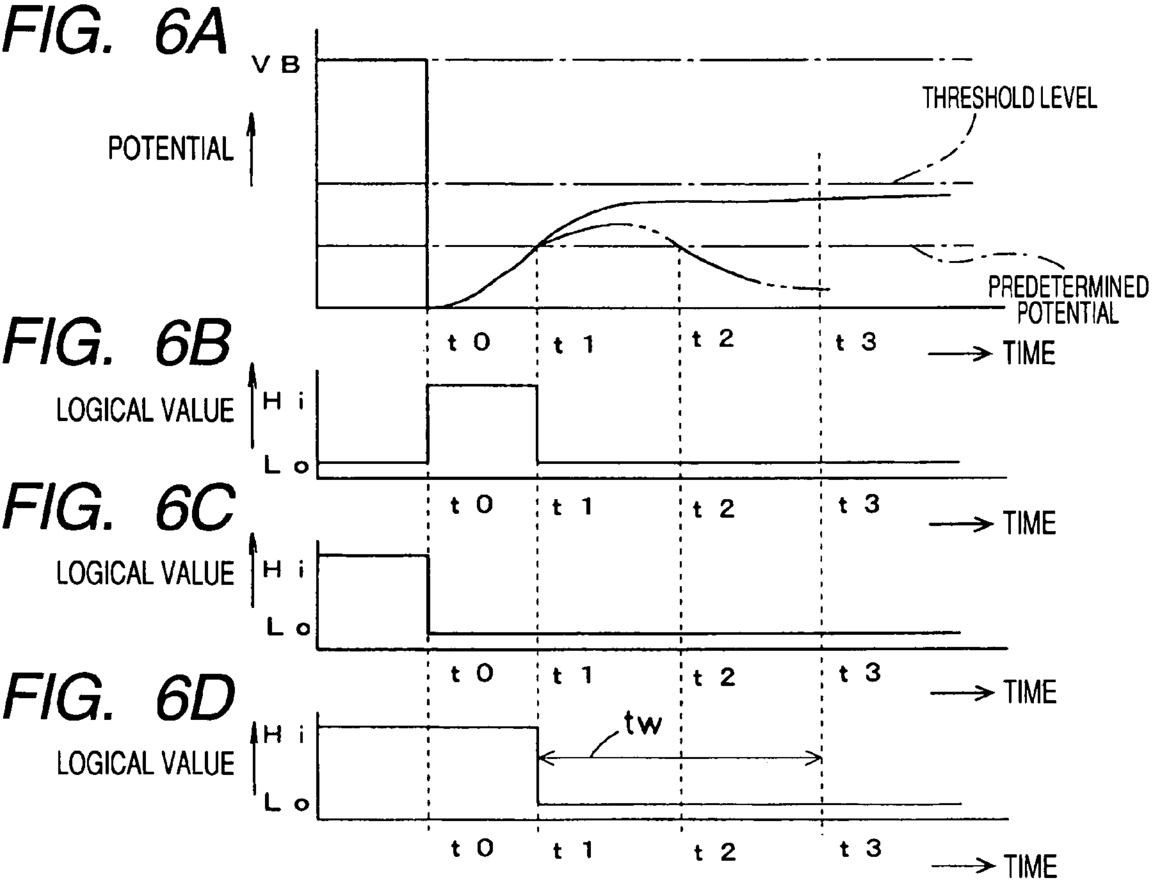
FIG. 6 shows time charts respectively illustrating an example of a potential variation at an input signal line 4 shown in FIG. 5, a corresponding comparator 9, a result of logic judgment and a change in logic output of an OR circuit 52.

FIG. 6A shows examples of the potential variation of the input signal line 4. FIGS. 6B, 6C, and 6D show variations of the logical outputs of the corresponding comparator 9, the logic judgment result and the OR circuit 52, respectively. As shown in FIG. 6A, the potential of the input signal line 4 is around the power-source voltage VB until the switch 2 is changed from the on state to the off state a time t0. The potential of the input signal line 4 is reduced to a level lower than the predetermined potential, at the time t0. At the time t0, the logic output of the comparator 9 shown in FIG. 6B is changed from the low level to the high level, and the logic judgment result shown in 6C is changed from the high level to the low level. Therefore, the logic output of the OR circuit 52 shown in 6D remains at a high level without changing.

When the contact resistance of the contact 3 increases, the potential of the input signal line 4 increases accordingly and exceeds a detection line (the predetermined potential) at the time t1. As shown in 6A, when the potential of the input signal line 4 exceeds the predetermined potential at the time t1, the logic output of the comparator 9 shown in FIG. 6B is changed from the high level to the low level, and the logic judgment result shown in FIG. 6C remains the low level without changing. Therefore, as shown in FIG. 6D, the logic output of the OR circuit 52 is changed from the high level to the low level. After the time t1, the output of the comparator 9 turns on the switching element 12, thereby flowing a corrosion-prevention current into the contact 3. Normally, even when the contact resistance of the contact 3 is increased due to its corrosion, if the corrosion-prevention current flows into the contact 3, the contact resistance thereof is decreased by a time t2 and it is expected that the potential of the input signal line 4 is decreased to be lower than the predetermined potential by the time t2 as shown by the dotted lines in FIG. 6A. The abnormality protecting section 53 concludes that the contact 3 is abnormal when the output of the OR circuit 52 is at a low level after a time t3 at which a time period tw, which is longer than a time period between the time t1 and the time t2, has been elapsed from the time t1.

Specifically, when a contact resistance of the contact 3 increases, the potential of the input signal line 4 changes toward one side in a magnitude relation. The predetermined potential given by the reference potential source 10 is set to be on the other side with respect to the threshold level, which is used to logically judge the potential of the input signal line 4, in the magnitude relation. The OR circuit 52 serving as an anomaly determining section compares the potential of the input signal line with the threshold level and determine as to whether or not the potential of the input signal line is abnormal on a basis of a comparison result of the comparator 9 and a comparison result of the OR section 52. For example, when the OR circuit 52 concludes that the input signal line 4 is abnormal, the OR circuit 52 outputs a low level; and when OR circuit 52 concludes that the input signal line 4 is not abnormal, the OR circuit 52 outputs a high level. The threshold level is set to have a sufficient margin with respect to the potential of the input signal line 4 when the contact resistance of the contact 3 is sufficiently small and the contact 3 is connected to the power-source potential side or the ground potential side. Therefore, even if the predetermined potential is set so as to detect increase of the contact resistance, the predetermined potential can be set on a side of the potential variation corresponding to decrease of the contact resistance of the contact 3 with respect to the threshold level (that is, the predetermined potential is set on the other side with respect to the threshold level in the magnitude relation). Even when the potential of the input signal line 4 changes from the other side of the predetermined potential to the one side of the predetermined potential in the magnitude relation, a result of the logical judgment shows that the contact 3 is in a contact state until the potential of the input signal line 4 reaches the threshold level. A non-contact state of the contact 3 is equivalent to a state where the contact resistance of the contact 3 is remarkably high. Consequently, the potential of the input signal line 4 is on the one side with respect to the predetermined potential and the threshold level in the magnitude relation. Therefore, when the result of the logical judgment becomes a logic on the side where the contact 3 is in contact state and the comparing result by the comparator 9 shows that the contact is corroded, even if it is concluded that the contact 3 is corroded and the corrosion-prevention current is flown, the contact resistance of the contact 3 is not decreased. Therefore, the apparatus 51 can conclude an abnormal operation state in which the corrosion-prevention function is nullified.

The abnormality protecting section 53 serving as a protecting section performs the predetermined protecting operation when the OR circuit 52 serving as the anomaly determining section keeps concluding for a predetermined time period that the potential of the signal line (4) is abnormal. Therefore, when the corrosion-prevention current is flown, it is expected that the contact resistance of the contact 3 is reduced. As a result, except for the potential of the input signal line 4 when the contact 3 is in the non-contact state, it is hardly possible that the potential of the input signal line 4 keeps being on the one side with respect to the predetermined potential in the magnitude relation. If such an abnormal operation occurs, the abnormality protecting section 53 performs the predetermined protecting operation.

Figure 7:
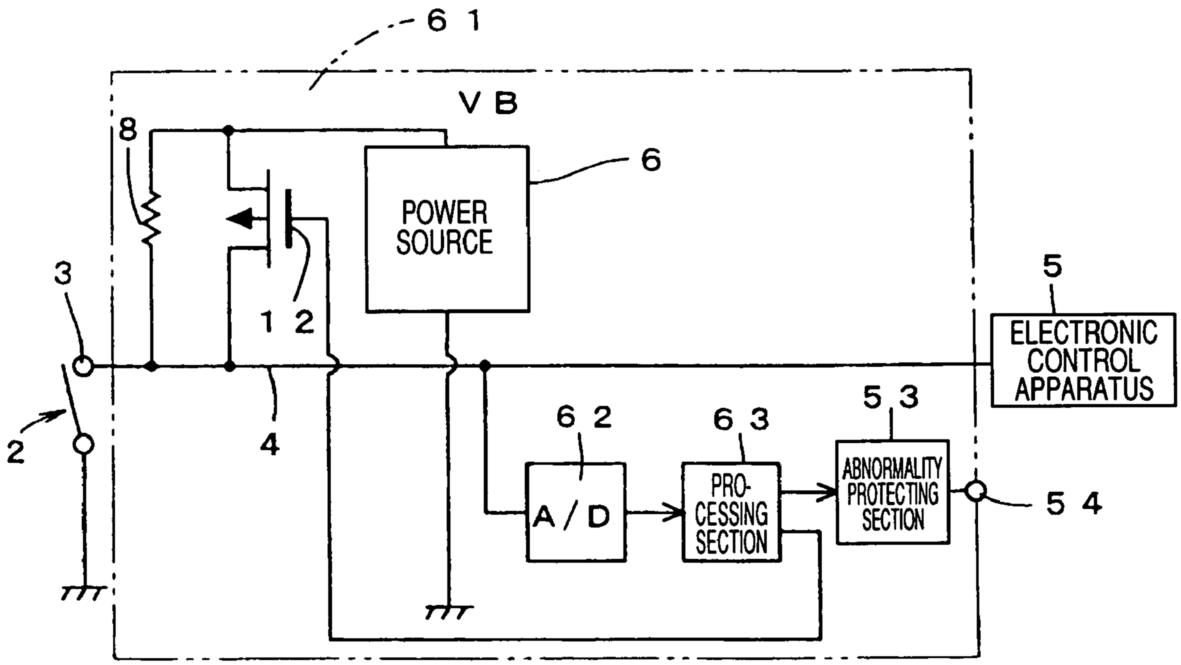
FIG. 7 is a block diagram illustrating a schematic electrical configuration of an apparatus 61 for preventing corrosion of a contact, according to a sixth embodiment of the invention.

FIG. 7 illustrates a schematic electrical configuration of an apparatus 61 for preventing corrosion of a contact, in accordance with a sixth embodiment of the invention. The apparatus 61 includes an analog/digital (A/D) converting section 62, which performs the A/D conversion with respect to the potential of the input signal line 4 and monitors the potential of the input signal line 4. A processing section 63 judges whether or not the contact 3 is corroded and whether or not the abnormal operation occurs, on a basis of the digital value converted by the A/D converting section 62. However, the corrosion judgment may be made by using the comparator 9 as described in the previous embodiment, and the abnormal operation may judged by using the processing section 63. Alternatively, the corrosion judgment may be made by using the processing section 63 and the abnormal operation may be judged as with FIG. 5.

Specifically, at least one of functions of the comparator 9 and the abnormally determining section makes the judgment of corrosion or the judgment of anomaly on a basis of the digital value of the potential monitored by the A/D converting section 62. Accordingly, the A/D converting section 62 performs the A/D conversion with respect to the potential of the input signal line 4 and monitors the potential of the input signal line 4 and at least one of the corrosion judgment and the judgment of abnormal operation is made on a basis of the digital value of the monitored potential. Therefore, the A/D converting section 62 is used effectively to make the judgment.

The abnormality protecting section 53 may perform the protecting operation against the abnormal operation in the following manner. That is, the abnormality protecting section 53 may further reduce an impedance of the input signal line 4, which is controlled to be a low impedance by the switching element 12 serving as a low impedance section. Since an impedance of the input signal line 4 can be reduced further at an abnormal time when the contact resistance of the contact 3 is not decreased even after the corrosion-prevention current is flown, it is possible to increase the corrosion-prevention current, which is flown into the contact 3. Further, at the abnormal time where it is difficult to restore the contact 3 because the contact resistance is not decreased after the predetermined corrosion-prevention current is flown, an impedance of the input signal line 4 can be further decreased to increase the corrosion-prevention current. If the corrosion-prevention current is increased, performance of removing an oxide can be improved. Therefore, it is expected that the contact resistance of the contact 3 is decreased.

Also, the abnormality protecting section 53 shown in FIGS. 5 and 7 outputs an abnormal signal of a contact to outside of the apparatuses 61, 62 through the external terminal 54, as a protecting operation. Since the protecting operation outputs the abnormal signal of the contact to the outside, the apparatuses 51, 61 can inform the outside that anomaly occurs in the corrosion-prevention function. Therefore, a self-diagnosis function provided with a control system that uses the contact 3 to input a signal can effectively use such an abnormal signal.

Figure 8:
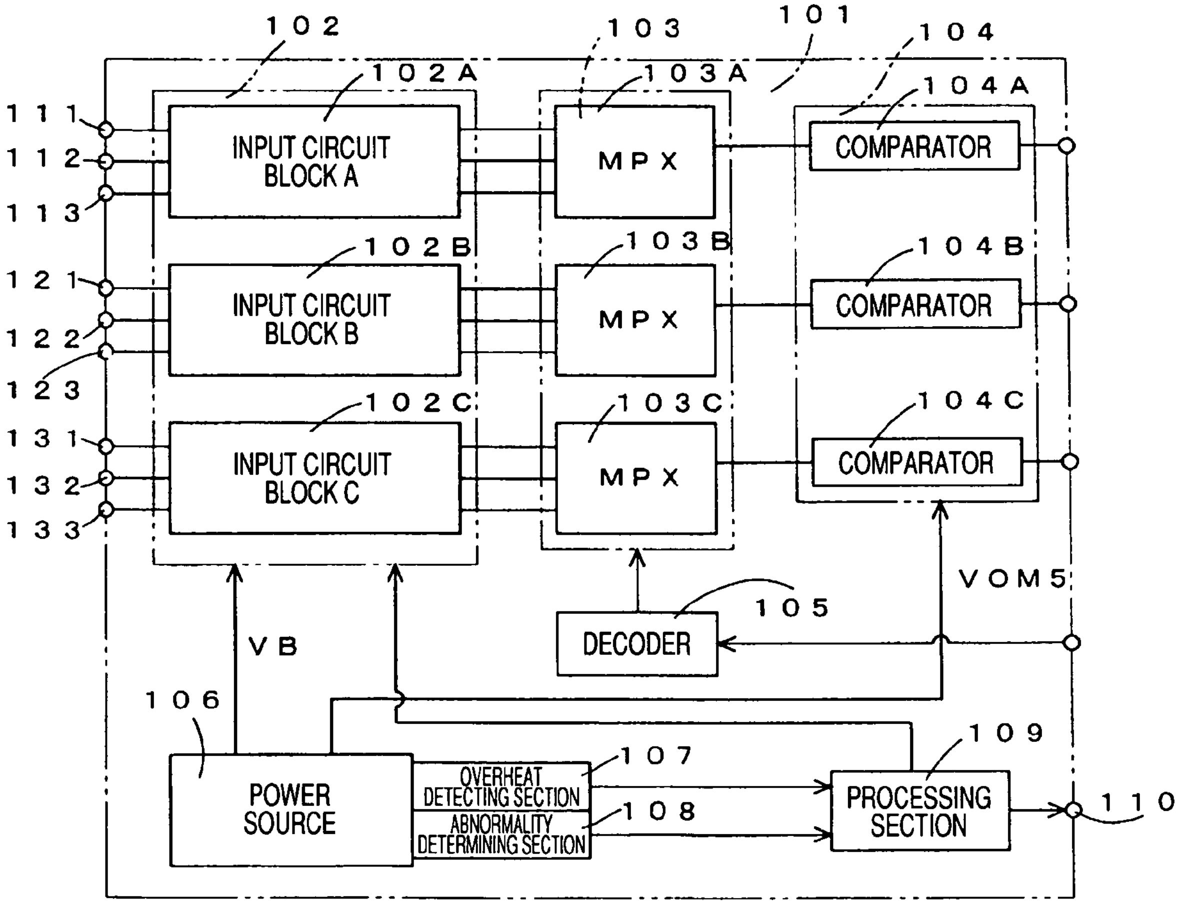
FIG. 8 is a block diagram illustrating a schematic electrical configuration of an apparatus 101 for preventing corrosion of a contact, according to a seven embodiment of the invention.

FIG. 8 illustrates a schematic electrical configuration of an apparatus 101 for preventing corrosion of a contact, in accordance with a seventh embodiment of the invention. The apparatus 101 is formed as an LSI having a function of selecting plural input signals. That is, the apparatus 101 includes an input circuit block 102 having plural channels. The apparatus 101 selects outputs of the plural channels from the input circuit block 102 by using a multiplexer 103 and makes a logical judgment by using a comparator 104 to out put a judgment result. The input circuit block 102 has an input circuit block A 102A, an input circuit block B 102B and an input circuit block C 102C, which are different from each other in circuit configuration. The multiplexer 103 has an MPX 103A for selecting channels of the imput circuit block A 102A, an MPX 103B for selecting channels of the input circuit block B 102B and an MPX 103C for selecting channels of the input circuit block C 102C. Outputs selected respectively by the MPX 103A, 103B and 103C are judged as logic values by comparators 104A, 104B and 104C of the comparator 104. The multiplexer 103 selects the channels in accordance with an output from the decoder 105.

Positive power-supply voltage VB is supplied to the input circuit block 102 from a power supply 106. Power-supply voltage VOM5 for the logic circuit is supplied at +5V to the comparator 104 from the power supply 106. An overheat detecting section 107 and an anomaly detecting section 108 are disposed in the vicinity of the power supply 106. A result of the overheat detecting section 107 and that of the anomaly detecting section 108 are given to a processing section 109 to perform operations including a protecting operation of outputting an abnormal signal to an external terminal 110.

Plural input channels of the input circuit block A 102A are connected to input terminals 111, 112, 113, . . . , respectively. Plural input channels of the input circuit block B 102B are connected to input terminals 121, 122, 123, . . . , respectively. Plural input channels of the input circuit block C 102C are connected to input terminals 131, 132, 133, . . . , respectively. The respective input terminals 111, 112, 113, . . . , 121, 122, 123, . . . and 131, 132, 133, . . . are connected to contacts such as an external switch or a connector.

Figure 9:
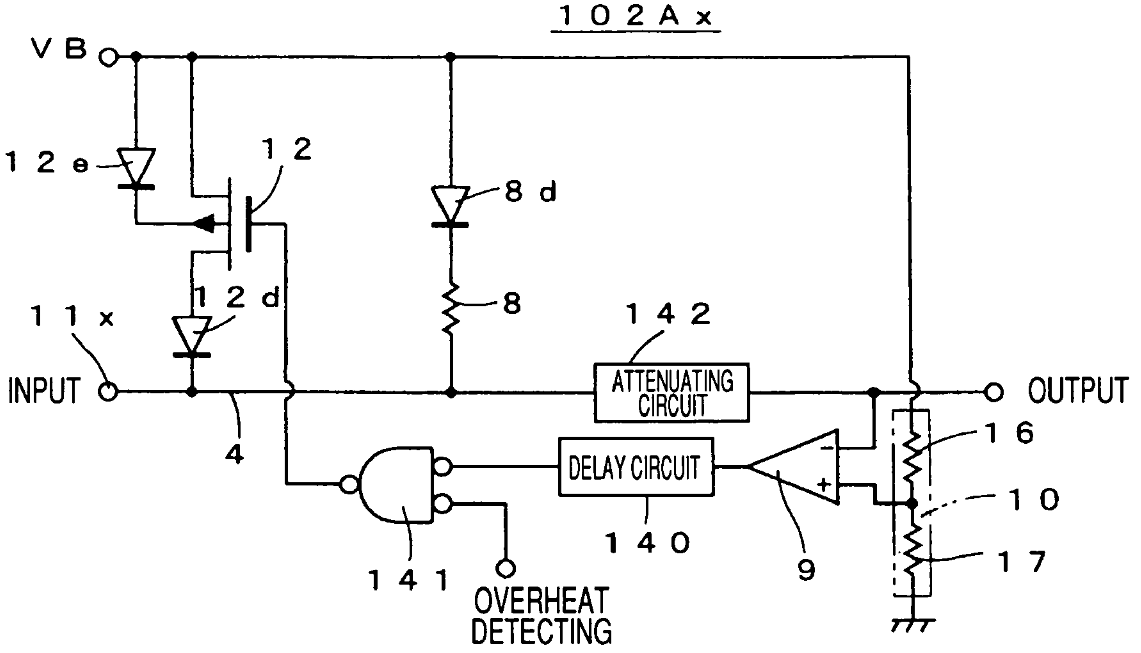
FIG. 9 is a block diagram illustrating a schematic electrical configuration of an apparatus 102_x_ for preventing corrosion of a contact, which is included in an input circuit block 102 shown in FIG. 8.

FIG. 9 shows a schematic electrical configuration of a circuit 102Ax for preventing corrosion of a contact, provided at one channel of the input circuit block A102A. An input signal line 4 is to be finally connected to the comparator 104A. Therefore, judgment as to whether a switch and a connector are turned on or off is made on a basis of the potential of the input signal line 4. It is assumed that an input terminal 11*x* to which the input signal line 4 is connected is used while a contact on the lower side of the power source 106 is connected thereto, as with FIGS. 1 to 5 and 7. A diode 8*d* is connected in series to the resistance 8 serving as an impedance element and prevents current from flowing in the inverse direction. An output of the comparator 9 is given to the switching element 12 via a delay circuit 140 and a gate circuit 141. The impedance of the resistance 8 is set to be higher than that of the switching element 12 at a time when the switching element 12 is turned on. When the switching element 12 is implemented by a P channel MOS transistor, a diode 12*d* is connected between the drain thereof and the input signal line 4 to prevent a current from flowing in the inverse direction. A diode 12*e* is also connected between the back gate of the P channel MOS transistor and the power source voltage VB. An overheat detecting signal from the processing section 109 shown in FIG. 8 are given to one input of the gate circuit 141. If overheat is not detected, the overheat detecting signal is kept at a low level. If overheat is detected, the overheat detecting signal is raised to a high level, thereby prohibiting the switching element 143 to turn on. An attenuating circuit 142 is inserted into the input signal line 4 The gate circuit 141 is equivalent to the OR circuit. An attenuating circuit 142 is inserted into the input signal line 4 and serves as an output to the MPX 103A. A function of the delay circuit 140 will be described later.

Figure 10:
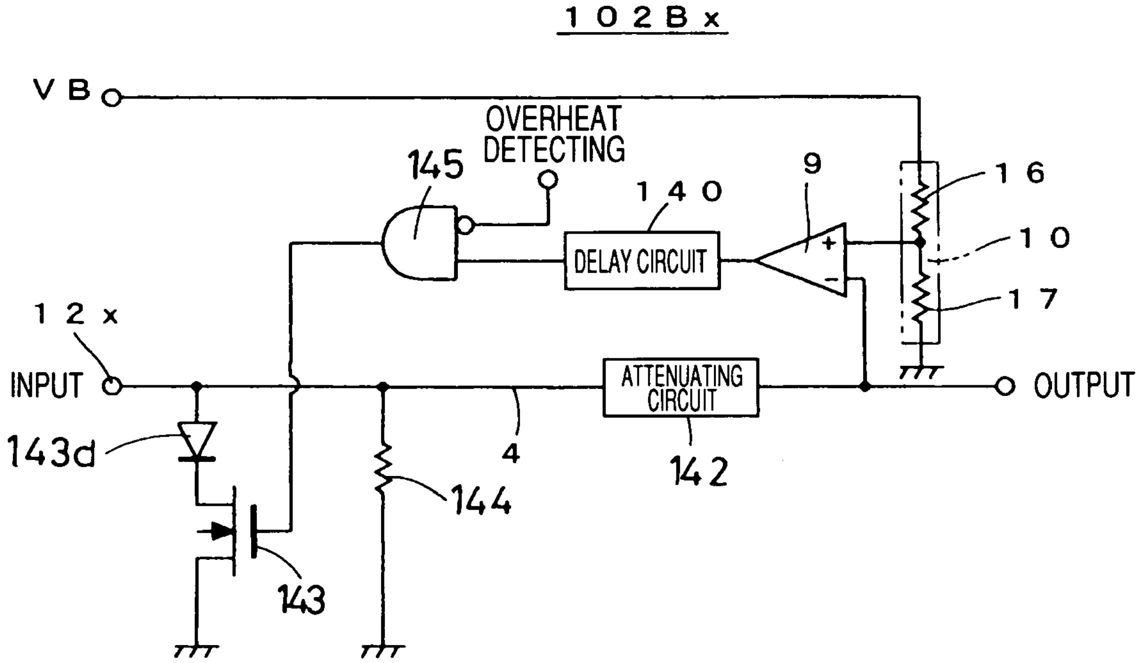
FIG. 10 is a block diagram illustrating a schematic electrical configuration of an apparatus 102_x_ for preventing corrosion of a contact, which is included in the input circuit block 102B shown in FIG. 8.

FIG. 10 shows a schematic electrical configuration of the circuit 102Bx for preventing corrosion of a contact at one channel of the input circuit block B 102B. The input signal line 4 is to be finally connected to the comparator 104B. Therefore, judgment as to whether a switch and a connector are turned on or off is made on a basis of the potential of the input signal line 4. Differently from FIGS. 1 to 5 and 7, it is assumed that an input terminal 12*x* to which the input signal line 4 is connected is used while a contact on the high side of the power source 106 is connected thereto. The switching element 143 serving as a low impedance section is implemented by an N channel MOS transistor. The switching element 143 and the resistance 144 serving as an impedance element are connected between the input signal line 4 and the ground. A diode 143*d* is connected in series between the drain of the N channel MOS transistor, which is the switching element 143, and the input signal line 4 to prevent current from flowing in the inverse direction. An output of the comparator 9 is given to the switching element 143 through the delay circuit 140 and the gate circuit 145. The overheat detecting signal from the processing section 109 shown in FIG. 8 is given to one input of the gate circuit 145. If overheat is not detected, the overheat detecting signal is kept at a low level. If overheat is detected, the overheat detecting signal is raised to a high level, to there by prohibit the switching element 143 from turning on. An attenuating circuit 142 is inserted into the input signal line 4 and serves as an output to the MPX 103B.

Figure 11:
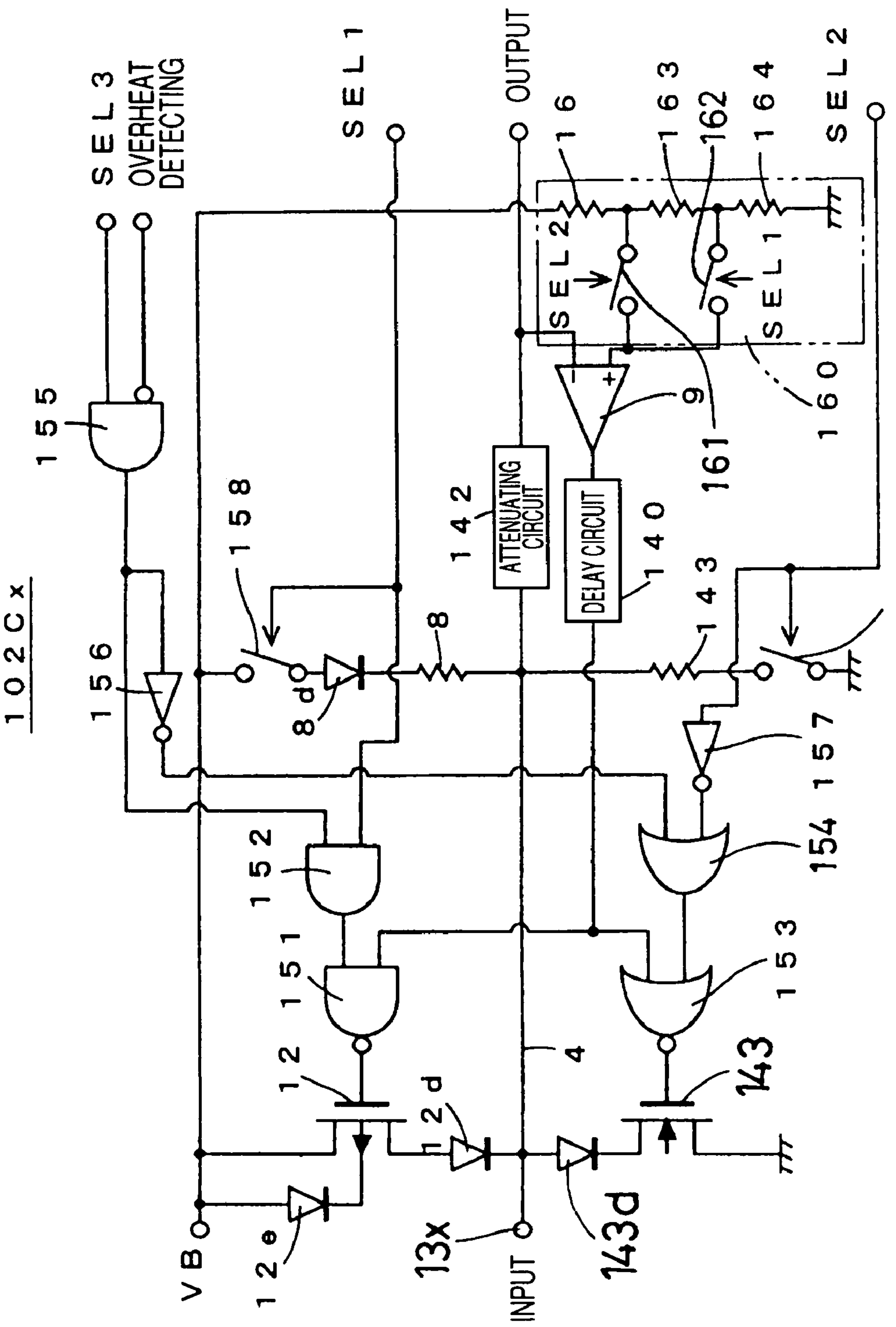
FIG. 11 is a block diagram illustrating a schematic electrical configuration of an apparatus 102Cx for preventing corrosion of a contact, which is included in the input circuit block 102C shown in FIG. 8.

FIG. 11 shows a schematic electrical configuration of a circuit 102Cx for preventing corrosion of a contact, at one channel of the input circuit block C 102C. The input signal line 4 is to be finally connected to the comparator 104C. Therefore, judgment as to whether a switch and a connector are turned on or off is made on a basis of the potential of the input signal line 4. Differently from FIGS. 1 to 5 and 7, it is assumed that a input terminal 13*x* to which the input signal line 4 is connected is used while not only a contact on the low side of the power source 106 but also to a contact on the high side of the power source 106 are connected thereto. A logic output of the comparator 9 is given to the switching element 12 via a NAND circuit 151 to which an output from the delay circuit 140 is given as one input. The output from an AND circuit 152 is given to the NAND circuit 151 as another input. The logic output of the comparator 9 is also given to the switching element 143 via a NOR circuit 153 to which the output from the delay circuit 140 is given as one input. The output from an OR circuit 154 is given to the NOR circuit 153 as another input. An output from a gate circuit 155 and an input of SEL1 are given to the AND circuit 152. A signal, which is obtained by inverting the output of the gate circuit 155 by an inverter 156, and a signal, which is obtained by inverting an input of SEL2 by an inverter 157, are given to the OR circuit 154. An input signal to SEL3 and the overheat detecting signal are given to the gate circuit 155.

When the input of the SEL1 is at a high level, a switch 158 is turned on to thereby connect the resistance 8 between the input signal line 4 and the power source voltage VB as an impedance element. When the input of the SEL2 is at a high level, a switch 159 is turned on to there by connect the resistance 144 between the input signal line 4 and the ground as an impedance element. When the input of the SEL1 and the input of the SEL2 are at the high level, switches 161 and 162 in a reference potential source 160 are turned on, respectively. Thereby, a voltage dividing circuit formed of the resistances 16, 163, and 164 is switched to change a predetermined potential used in corrosion judgment by the comparator 9.

FIG. 12 shows relation between selected functions of the input circuit block 102C and the three selection signals SEL1, SEL2 and SEL3 shown in FIG. 11. When the SEL1 is raised to a high level, a switch can be connected to a low side, as with the input circuit block A 102A. When the SEL2 is raised to a high level, a switch can be connected to a high side, as with the input circuit block B 102B. When the SEL3 is raised to a high level, a function of preventing corrosion of a contact is turned on.

Figure 13A:
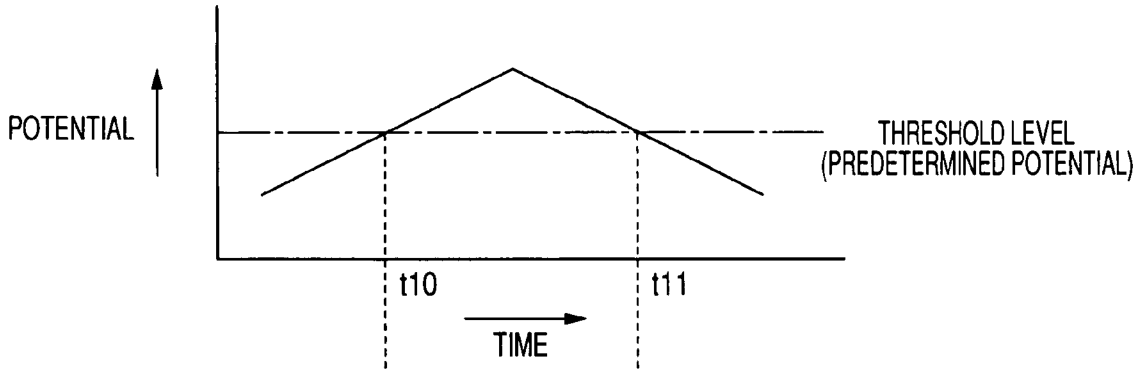
FIG. 13 shows time charts illustrating operations of a delay circuit 140 shown in FIG. 9 to FIG. 11.
Figure 13B:
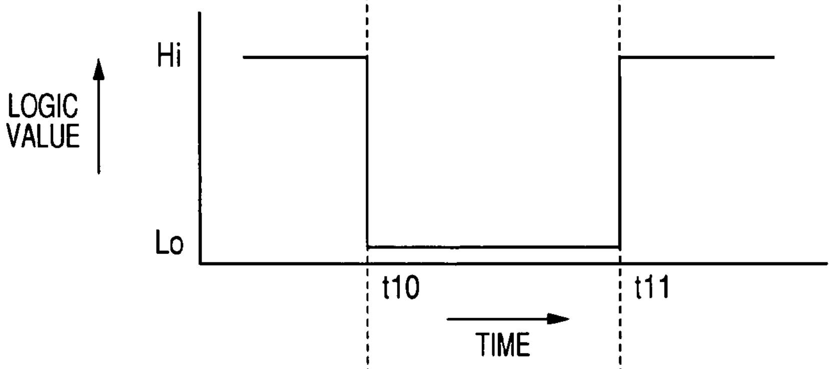
Figure 13C:
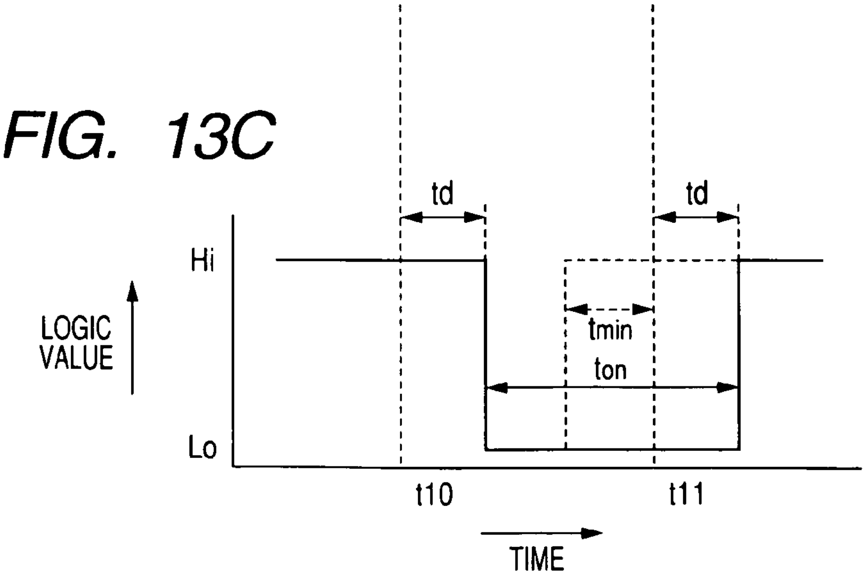

FIG. 13 shows an operation of the delay circuit 140 shown in FIGS. 9 to 11. FIG. 13A shows changes in the voltage of the input signal line 4, which is input to the comparator 9. FIG. 11B shows the logic output of the comparator 9. FIG. 11C shows the output of the delay circuit 140. When the input of the comparator 9 exceeds a threshold level (the predetermined potential) from time t10 to time t11 as shown in FIG. 11A, the output of the comparator 9 lowers to a low level as shown in FIG. 11B. The delay circuit 140 has, for example, delay time td of about 5 μs. When the same logic value is continuously kept for the delay time td, the delay circuit 140 outputs such a logic value after the delayed time td elapsed. Therefore, as shown in 11C, after the delay time td elapsed from the time t10, the output of the delay circuit 140 lowers to a low level. As shown by the dotted line in FIG. 11C, the high level is kept for a minimum time tmin, which is identical to the delay time td. If time from t10 to t11 is longer than the delay time td, the output of the delay circuit 140 is changed to the high level after the delay time td elapsed from the time t11. The circuit 101 for preventing corrosion of a contact includes channels connected to the input signal line 4, for each contact. The overheat detecting section 107 detects whether or not a predetermined overheat state occurs during a period where the corrosion-prevention current flows into the input signal line 4 of any of the channels. When the corrosion-prevention current does not flow, heat is almost not generated. Therefore, the overheat state does not occur. The processing section 109 responds to a detection result by the overheat detecting section 107. When the overheat detecting section 107 detects the overheat state, the processing section 109 functions as an operation inhibiting section that inhibits the switching elements 12, 143, which serve as the low impedance section for a channel where the corrosion-prevention current flows, from flowing the corrosion-prevention current. The processing section 109 has a function of detecting whether or not the corrosion-prevention current flows in each channel and a function of raising only the overheat detecting signal for a channel where the corrosion-prevention current flows to a high level. When an abnormal operation occurs where the corrosion-prevention current keeps flowing in one channel, the processing section 109 inhibits the corrosion-prevention current from flowing in the channel so as to perform a protecting operation for reducing the heat generation while allowing the corrosion-prevention current to flow in the other channels (the corrosion-prevention function in the other channels is prevented from being invalidated).

Also, the anomaly determining section 108 monitors control signals for turning on the switching elements 12, 13, 14 serving as an low impedance section the corrosion-prevention current flowing into each of the input signal lines 4 from the power source 106. When a period where the corrosion-prevention current flows in one channel of the input signal line 4 overlaps at least partly with a period where the corrosion-prevention current flows in another channel of the input signal line 4, the anomaly determining section 108 concludes that anomaly occurs. Since the corrosion-prevention current does not flow often, it is not expected that the corrosion-prevention current often flows into a plurality of contacts simultaneously. When the contact is abnormal, the corrosion-prevention operations for the respective contacts are performed independently. Therefore, there is a possibility that the corrosion-prevention operations may overlap in terms of time. The anomaly determining section 108 monitors the corrosion-prevention current flowing into each of the input signal lines 140 from the power source 106. When a period where the corrosion-prevention current flows in one channel of the input signal line 4 overlaps at least partly with a period where the corrosion-prevention current flows in another channel of the input signal line 4, the anomaly determining section 108 concludes that anomaly occurs. Therefore, judgment as to whether or not the contact is abnormal can be made easily.

What is claimed is:

1. An apparatus for preventing a contact from being corroded, the apparatus comprising:

a power source;

a signal line connected to the contact;

a first resistance connected to the signal line;

a switching section that comprises a first switch between the power source and the signal line, an impedance of the first switch being smaller than that of the first resistance when the first switch is turned on;

a comparator that compares a potential of the signal line with a predetermined potential to determine as to whether or not the contact is corroded, the comparator outputting a driving signal when the comparator concludes that the contact is corroded; and an overheat detecting section that detects as to whether or not temperature of the apparatus exceeds a predetermined temperature, the overheat detecting section decreasing current flowing through the switching section when the temperature of the apparatus exceeds the predetermined temperature, wherein:

the first resistance and the switching section are connected in parallel between the power source and the signal line; and upon receiving the driving signal from the comparator, the first switch is turned on.

2. The apparatus according to claim 1, wherein the overheat detecting section decreases the current flowing through the switching section when the temperature of the apparatus exceeds the predetermined temperature and the current flows through the switching section.

3. The apparatus according to claim 1, further comprising:

a third switch, one end of which is connected to the comparator, wherein:

the switching section further comprises a second switch and a second resistance between the power source and the signal line, the second switch and the second resistance being connected in series;

the first switch and the second switch are connected in parallel;

another end of third switch are changed between the first switch and the second switch;

a sum of an impedance of the second switch and an impedance of the second resistance is smaller than that of the first resistance when the second switch is turned on;

when the overheat detecting section concludes that the temperature of the apparatus exceeds the predetermined temperature, the overheat detecting section changes the third switch from a first-switch side to a second-switch side; and upon receiving the driving signal from the comparator the second switch is turned on.

4. The apparatus according to claim 1, wherein when the overheat detecting section concludes that the temperature of the apparatus exceeds the predetermined temperature, the overheat detecting section inhibits current from flowing into the switching section.

5. The apparatus according to claim 1, wherein when the overheat detecting section concludes that the temperature of the apparatus exceeds the predetermined temperature, the overheat detecting section changes the predetermined potential so that the comparator concludes that the contact is not corroded.

6. The apparatus according to claim 5, further comprising:

a reference potential setting section that comprises a third resistance, a fourth resistance, a fifth resistance, and a fourth switch between the power source and a ground, wherein:

the third to fifth resistances are connected in series;

the third resistance and the fourth switch are connected in parallel;

the comparator uses a potential of an intermediate point between the fourth resistance and the fifth resistance as the predetermined potential; and when the overheat detecting section concludes that the temperature of the apparatus exceeds the predetermined temperature, the overheat detecting section turns on the fourth switch to short-circuit both ends of the third resistance.

7. The apparatus according to claim 1, wherein:

when the potential of the signal line is on one side with respect to the predetermined potential in a magnitude relation, the comparator concludes that the contact is corroded;

when the potential of the signal line is on the other side with respect to the predetermined potential in the magnitude relation, the comparator concludes that the contact is not corroded; and when the overheat detecting section concludes that the temperature of the apparatus exceeds the predetermined temperature, the overheat detecting section changes the predetermined potential so that the potential of the signal line is on the other side with respect to the predetermined potential in the magnitude relation.

8. The apparatus according to claim 1, further comprising:

a current limiting section that limits current flowing into the switching section when the overheat detecting section concludes that the temperature of the apparatus exceeds the predetermined temperature.

9. The apparatus according to claim 8, wherein the current limiting section is disposed between the power source and the first resistance and between the power source and the switching section.

10. The apparatus according to claim 1, wherein the switching section further comprises a sixth resistance connected with the first switch in series, the sixth resistance having a positive temperature characteristic.

11. An apparatus for preventing a contact from being corroded, the apparatus comprising:

a power source;

a signal line connected to the contact;

a resistance connected to the signal line;

a switch disposed between the power source and the signal line, an impedance of the switch being smaller than that of the resistance;

a comparator that compares a potential of the signal line with a predetermined potential to determine as to whether or not the contact is corroded, the comparator outputting a driving signal when the comparator concludes that the contact is corroded;

an anomaly determining section that compares the potential of the signal line with a threshold level and determine as to whether or not the potential of the signal line is abnormal on a basis of a comparison result of the anomaly detecting section; and a protecting section that performs a predetermined protecting operation when the anomaly determining section keeps determining that the potential of the signal line is abnormal, for a predetermined time period, wherein:

when a contact resistance of the contact increases, the potential of the signal line changes toward one side in a magnitude relation;

the predetermined potential is set to be on the other side with respect to the threshold level in the magnitude relation;

the resistance and the switch are connected in parallel between the power source and the signal line; and upon receiving the driving signal from the comparator, the switch is turned on.

12. The apparatus according to claim 11, wherein:

when the potential of the signal line is on the one side with respect to the predetermined potential in the magnitude relation, the comparator concludes that the contact is corroded;

when the potential of the signal line is on the other side with respect to the predetermined potential in the magnitude relation, the comparator concludes that the contact is not corroded;

when the potential of the signal line is on the other side with respect to the threshold level and is on the one side with respect to the predetermined potential in the magnitude relation ship, the anomaly determining section concludes that the potential of the signal line is abnormal.

13. The apparatus according to claim 11, wherein:

the power source comprises a first terminal and a second terminal, potential of which is smaller than that of the first terminal;

the resistance is connected between the first terminal of the power source and the signal line;

the switch is connected between the first terminal of the power source and the signal line;

when the potential of the signal line exceeds the predetermined potential, the comparator outputs the driving signal;

when the potential of the signal line is between the predetermined potential and the threshold level, the anomaly determining section concludes that the potential of the signal line is abnormal; and the threshold level is larger than the predetermined potential.

14. The apparatus according to claim 11, wherein:

the power source comprises a first terminal and a second terminal, potential of which is smaller than that of the first terminal;

the resistance is connected between the second terminal of the power source and the signal line;

the switch is connected between the second terminal of the power source and the signal line;

when the potential of the signal line is less than the predetermined potential, the comparator outputs the driving signal;

when the potential of the signal line is between the threshold level and the predetermined potential, the anomaly determining section concludes that the potential of the signal line is abnormal; and the threshold level is smaller than the predetermined potential.

15. The apparatus according to claim 12, wherein the anomaly determining section determines as to whether or not the potential of the signal line is abnormal, on a basis of a comparison result provided by the comparator and the comparison result by the anomaly determining section.

16. The apparatus according to claim 11, further comprising:

an A/D converting section that converts the potential of the signal line into a digital value, wherein:

at least one of the comparator and the anomaly determining section uses the digital value to perform the comparing.

17. The apparatus according to claim 12, wherein the protecting section changes the potential of the signal line so that the potential of the signal line is on the other side with respect to the predetermined potential in the magnitude relation, as the protecting operation.

18. The apparatus according to claim 13, wherein the protecting section decreases the potential of the signal line so that the potential of the signal line becomes less than the predetermined potential, as the predetermined protecting operation.

19. The apparatus according to claim 14, wherein the protecting section increases the potential of the signal line so that the potential of the signal line exceeds the predetermined potential, as the predetermined protecting operation.

20. The apparatus according to claim 11, wherein the protecting section outputs an abnormal signal to an external of the apparatus, as the predetermined protecting operation.

21. An apparatus for preventing a plurality of contacts from being corroded, the apparatus comprising:

a plurality of preventing devices provided for the contacts, respectively;

a power source; and an anomaly determining section, wherein:

each of the preventing devices comprises:

a signal line connected to the contact;

a resistance connected to the signal line;

a switch disposed between the power source and the signal line, an impedance of the switch being smaller than that of the resistance when the switch is turned on; and a comparator that compares a potential of the signal line with a predetermined potential to determine as to whether or not the contact is corroded, the comparator outputting a driving signal when the comparator concludes that the contact is corroded; and when current flows through the switches in at least two of the signal lines of the preventing apparatuses simultaneously, the anomaly determining section concludes that the signal lines are abnormal.

* * * * *